United States Patent [19]

Schockman

[11] Patent Number: 5,136,875
[45] Date of Patent: Aug. 11, 1992

[54] SINGLE RECIPROCATING DYNAMIC BALANCER FOR A DOUBLE ACTION STAMPING PRESS

[75] Inventor: Robert L. Schockman, St. Henry, Ohio

[73] Assignee: The Minster Machine Company, Minster, Ohio

[21] Appl. No.: 666,255

[22] Filed: Mar. 8, 1991

[51] Int. Cl.[5] .................................................. B21J 9/18
[52] U.S. Cl. ........................................ 72/417; 72/452; 100/254; 100/282; 83/615; 74/603
[58] Field of Search ................. 72/417, 438, 445, 452; 100/254, 257, 259, 282; 83/527, 615; 74/603

[56] References Cited

U.S. PATENT DOCUMENTS

| | | | |
|---|---|---|---|
| 2,357,557 | 9/1944 | Sherman et al. | 83/615 |
| 2,610,524 | 9/1952 | Maussnest | 74/603 |
| 3,450,038 | 6/1969 | Kraft et al. | 100/282 |
| 3,611,918 | 10/1971 | Marsh | 83/615 |
| 4,674,357 | 6/1987 | Sugawara et al. | 74/590 |
| 4,757,734 | 7/1988 | Portmann | 100/282 |
| 4,890,524 | 1/1990 | Brown et al. | 83/615 |

FOREIGN PATENT DOCUMENTS

| | | | |
|---|---|---|---|
| 2444083 | 4/1975 | Fed. Rep. of Germany | 72/417 |
| 2806976 | 8/1978 | Fed. Rep. of Germany | 100/282 |
| 3040686 | 5/1982 | Fed. Rep. of Germany | 74/603 |

Primary Examiner—David Jones
Attorney, Agent, or Firm—Baker & Daniels

[57] ABSTRACT

A double action mechanical press, especially for cupping operations in which an outer slide is provided within which an inner slide is reciprocally mounted on a common crankshaft. According to the present invention, a single dynamic balancer, out of phase from both the inner and outer slides, is provided on the crankshaft in order to counterbalance the inertial forces generated by the inner and outer slides during press operation.

8 Claims, 4 Drawing Sheets

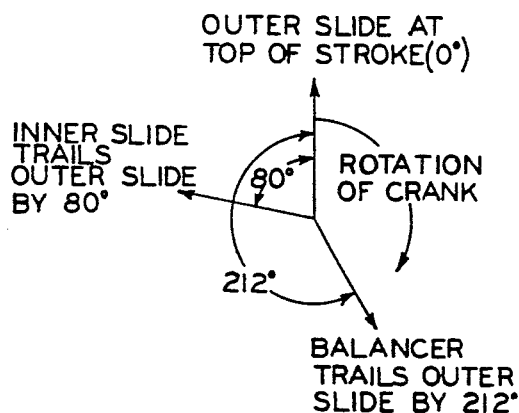
FIG_3
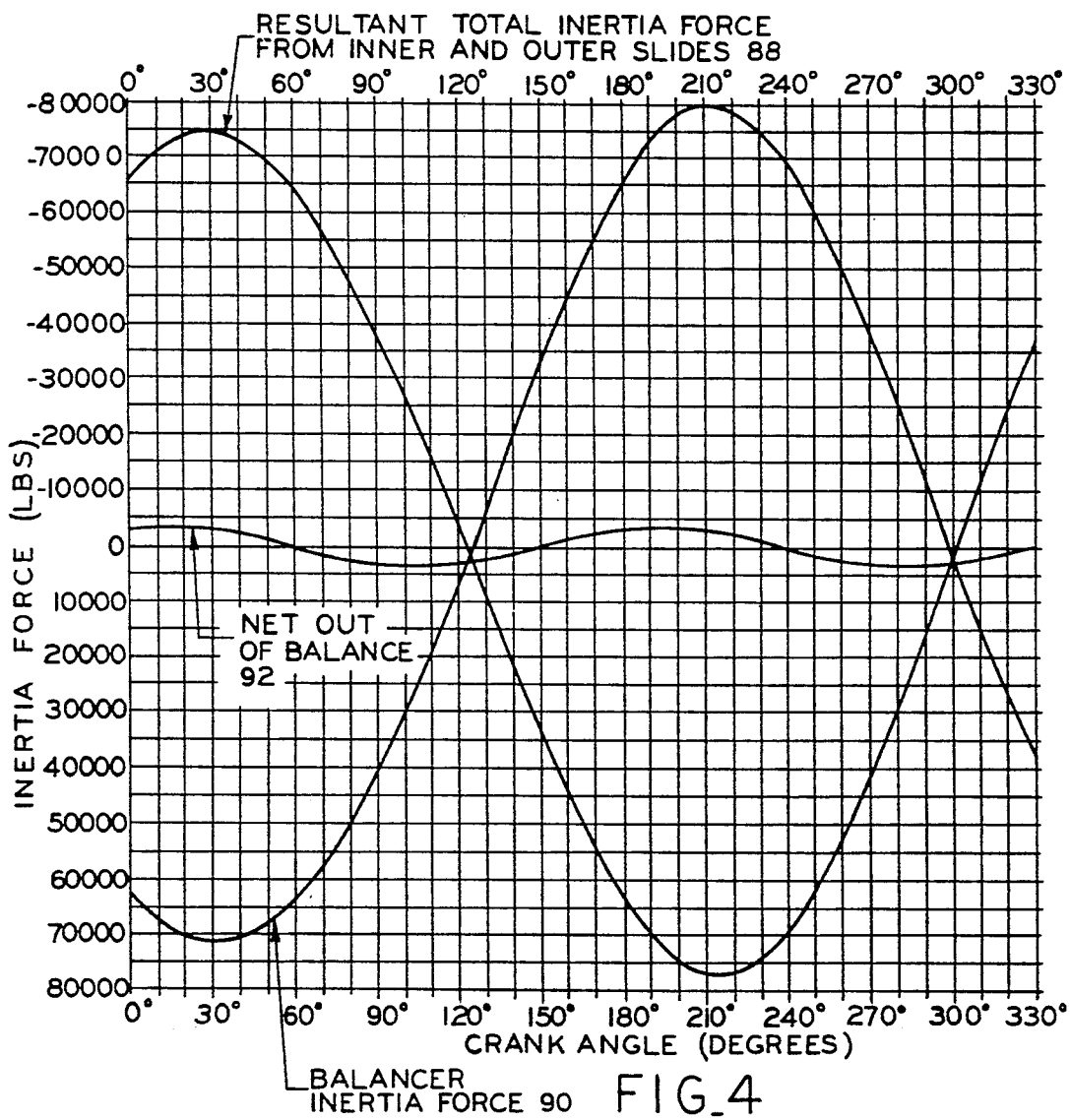
FIG_4

SINGLE RECIPROCATING DYNAMIC BALANCER FOR A DOUBLE ACTION STAMPING PRESS

BACKGROUND OF THE INVENTION

The present invention relates to double action stamping presses and, more particularly, to a method and apparatus for balancing a double action stamping press.

Double action presses comprise an inner and outer slide both of which are driven off a single crankshaft wherein two stamping operations are performed in one stroke. Often, a press of this type is used in the container industry as a press in the manufacture of beverage container cups or shells. Strip stock material is fed into the double action shell or cupping press wherein the outer slide blanks out a disc, and then the inner slide die almost immediately forms the disc into a shallow cup.

During this type of operation, the double action press has typically been run at approximately 150 stokes per minute (spm). However, due to today's current output demand, double action presses are being run at approximately 350 spm more than double the past rate. At these higher stroke speeds, inertia forces generated by the vertically reciprocating inner and outer slides and upper dies create strong vibrations in the press structure which are transmitted into the press foundation and surrounding building structure.

Thus, by increasing twofold the number of strokes per minute, severe vibrations are produced which quickly cause damage to the press structure, press foundation, and the surrounding building structure. Therefore it is necessary to minimize the vibrations created by the inertia forces of the slides and upper dies attached to slides by balancing the press. It is generally difficult to balance a double action press because of the phase difference between the inner and outer slides and also the difference in stroke lengths.

A prior art solution isolates the press structure from the building structure such that the manifested vibrational forces are not transmitted or reflected thereto. This is accomplished by providing a separate, dedicated concrete foundation of several hundred thousand pounds isolated from the building structure on which the double action press must be mounted. This solution however does not reduce vibrations created by the inertia forces, and although the building structure is relatively free from damaging vibration, the press structure and foundation are not.

Another type of balancer is the counter rotating geared shafts with counter weights. The inertia forces of the slides are then balanced by the counterweighted rotating shaft. However, this rotating inertia is stopped and started as the press slides go up and down, and takes five or six strokes to fully stop the press for maintenance, die change, or the like.

SUMMARY OF THE INVENTION

A possible method of balancing a double action press would require two dynamic balancers to balance the reciprocating motion of the inner and outer slides. Each balancer would offset the inertia force, and thus the vibration associated therewith, generated by the respective slide. This solution adds weight to the press, requires more and stronger bearings for shaft support and adds size to housing. Additionally, there is the problem of limited room in the press structure for bearing connections if two counterbalancers are utilized to respectively counterbalance the two slides.

The present invention is a method of and apparatus for balancing a double action press by utilizing a single reciprocating dynamic balancer. A resultant total inertia force curve is derived from separate inertia force curves of the inner and outer slides. Surprisingly, it has been found that this resultant total inertia force curve is nearly sinusoidal so that a balancing inertia force can be achieved by a single reciprocating mass. A balancer inertia force curve is then plotted which is 180° out of phase from the resultant total inertia force curve. The stroke length and balancer weight are chosen such that a curve of the inertia force generated by the balancer is substantially identical to the balancer inertia force curve derived from the resultant total inertia force curve. The balancer is then connected to the press shaft for operation.

The present invention solves the above problems by reducing approximately 90%–96% of the vibration generated by the inertia forces of the inner and outer slides with a single reciprocating dynamic balancer. A reduction of the vibration allows the press to be mounted virtually anywhere without the need for large dedicated foundations or press isolation. Thus, very soft press shock mounts can be utilized.

In addition, by utilizing a centrally located single reciprocating dynamic balancer, less room and bearing mounts are required in the press housing allowing compactness and reducing overall press weight and expense.

The present inventive method of balancing the inertia forces of a double action press includes generating sinusoidal inertia force curves for the inner and outer slides and adding them into a resultant curve and providing in the press a dynamic balancer having a single mass driven by the crankshaft in a sinusoidal motion having an inertia force curve substantially opposite and equal to the resultant force curve.

The present apparatus comprises a double action press having a crankshaft connected to an inner slide exhibiting an inertia force curve, an outer slide exhibiting an inertia force curve and a reciprocating dynamic balancer means for substantially counterbalancing both the inner and outer slides.

It is thus an object of the present invention to externally balance the vertical inertia forces generated by the inner and outer slides of a double action press and thus significantly reduce the vibration associated therewith by providing a single reciprocating dynamic balancer.

BRIEF DESCRIPTION OF THE DRAWINGS

The above mentioned and other features and objects of this invention, and the manner of attaining them, will become more apparent and the invention itself will be better understood by reference to the following description of the embodiment of the invention taken in conjunction with the accompanying drawings, wherein:

FIG. 3 is a phase relationship graph of the cranks of the outer slide, inner slide, and the balancer;

FIG. 4 is a graph of the net out of balance inertia force versus crank angle resulting from the superposition of the resultant total inertia force curve versus the resultant crank angle and the balancer inertia force curve versus crank angle.

Figure 1:
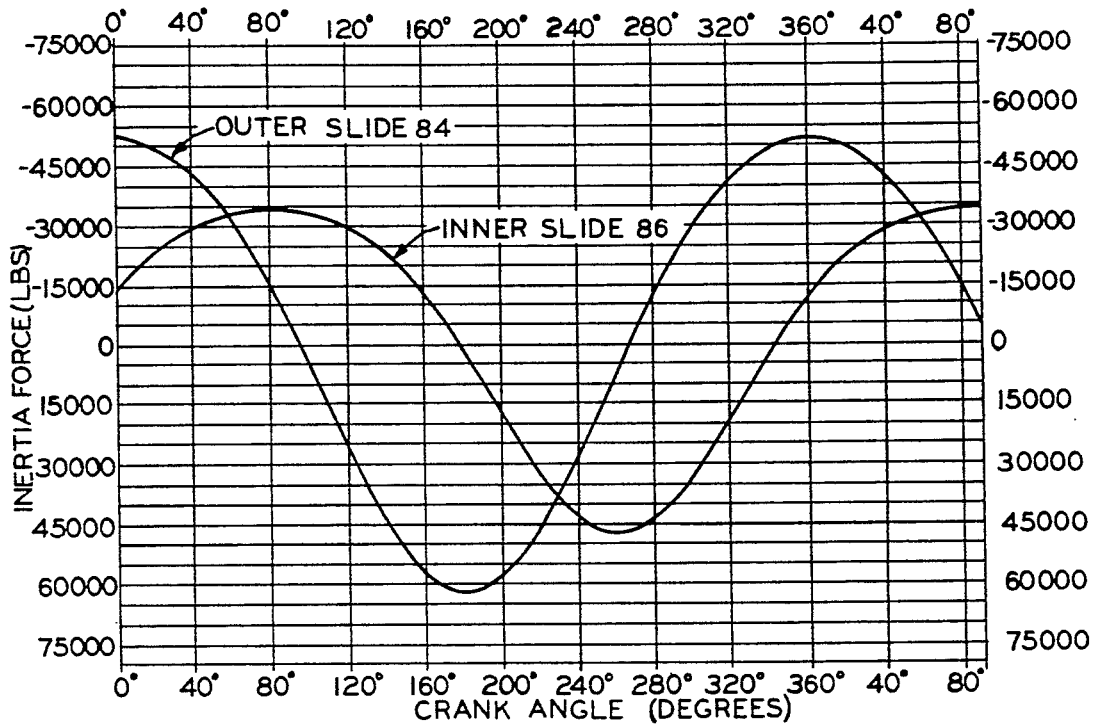
FIG. 1 is a graph of the inertia forces of the inner and outer slide versus the crank angle of the slides.

Corresponding reference characters indicate corresponding parts throughout the several views. The exemplification set out herein illustrates a preferred embodiment of the invention, in one form thereof, and such exemplification is not to be construed as limiting the scope of the invention in any manner.

DESCRIPTION OF THE PREFERRED EMBODIMENT

Figure 5:
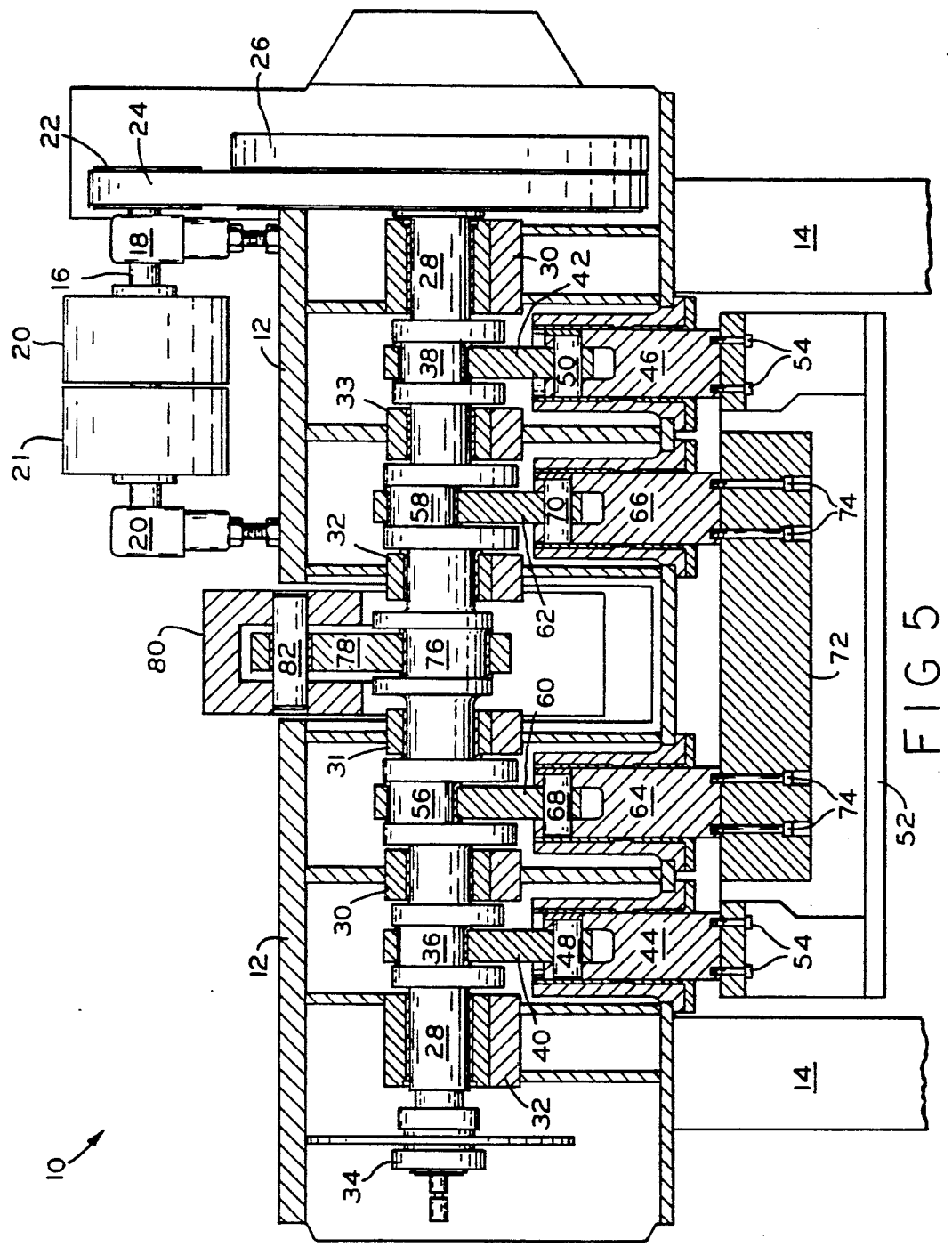
FIG. 5 is a fragmentary cutaway elevational view of the double action press of the present invention.

Referring to FIG. 5, there is shown the crown and slide portion of a double action press 10 with a conventional base and bolster (not shown) in accordance with the objects of the present invention. Press 10 includes a crown housing 12 which is supported above the press bed (not shown) by uprights 14. A shaft 16 is rotatably supported by shaft bearings 18 and 19 which are fixedly mounted on housing 12. A flywheel 20 and V-pulleys 21, driven by a motor (not shown) are fixedly mounted to shaft 16 so as to rotate therewith. Attached to the end of shaft 16 is a pulley 22 around which is a belt 24 having the other end in rotational engagement with flywheel and clutch 26. Flywheel 20 imparts its rotational inertia through belt 24 and flywheel and clutch 26 to rotate crankshaft 28 connected at one end to clutch 26.

Crankshaft 28 is rotatably supported in main bearings 30 and 32, and includes a hydraulic brake assembly 34 connected on one end thereof for stopping or slowing crankshaft 28. Four intermediate bearings 30, 31, 32 and 33 also rotatably support crankshaft 28.

Outer slide throws 36 and 38 on crankshaft 28, are respectively radially surrounded by outer slide connections 40 and 42, which are respectively connected to outer pistons 44 and 46 by respective outer wrist pins 48 and 50. Outer slide 52 is securely connected to both outer pistons 44 and 46 by bolts 54.

Likewise, inner slide throws 56 and 58 on crankshaft 28, are respectively radially surrounded by inner slide connections 60 and 62, which are respectively connected to inner pistons 64 and 66 by respective inner wrist pins 68 and 70. Inner slide 72 is securely connected to both inner pistons 64 and 66 by bolts 74.

In accordance with the present invention, a balance throw 76 is centrally located on crankshaft 28 between inner throws 56 and 58. Throw 76 is radially surrounded by balancer slide connection 78 which is connected to balancer 80 through balancer wrist pin 82.

Outer throws 36 and 38, and inner throws 56 and 58 are eccentric on crankshaft 28 such that, as depicted in FIG. 3, the top of the stroke of inner slide 72 lags the top of the stroke of outer slide 52 by 80°. Thus outer slide 52 contacts the stock material before inner slide 72 contacts the stock material. Further, FIG. 3 shows that the top of the stroke of balancer 80 lags the top of the stroke of the outer slide by 212°.

As crankshaft 28 rotates, outer throws 36, 38 and inner throws 56, 58 both eccentrically rotate relative to crankshaft 28. Thus outer pistons 44, 46 and inner pistons 64, 66, connected to their respective throws by outer connections 40, 42 through inner wrist pins 48, 50 and inner connections 60, 62 through outer wrist pins 68, 70, are vertically reciprocated which in turn vertically reciprocate outer slide 52 and inner slide 72 respectively connected thereto.

Figure 6:
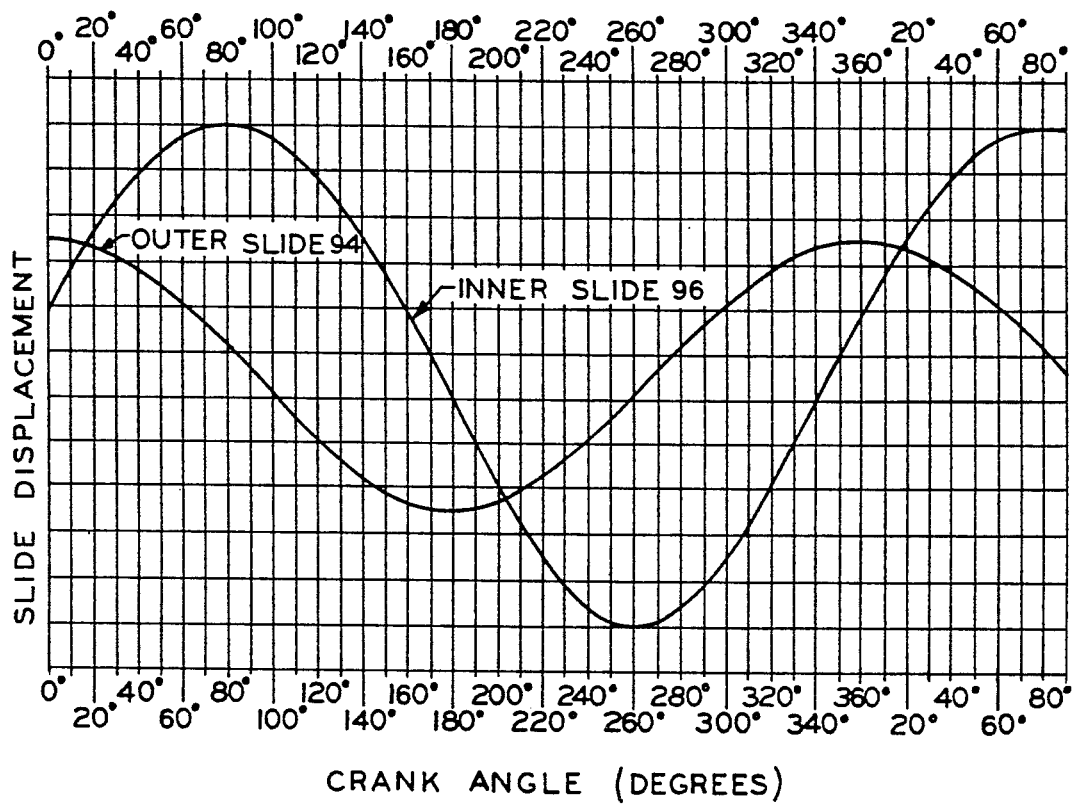
FIG. 6 is a graph of the displacements of the inner and outer slide versus the crank angle of the slides.

The method of balancing a double action press utilizing a single reciprocating dynamic balancer or determining the balancer will now be described. A typical example of the specifications of a double action press, which were utilized for the generation of these curves and balancer design follows. It is to be noted that the inventive principles described herein apply to all configurations of a double action press and not to the particular parameters herein used. The press was run at a speed of 350 spm. The outer slide 52 has a 3 inch stroke and weighs 10,900 pounds with its respective die and is driven by an 18 inch long connection, comprising outer slide connections 40, 42 and outer pistons 44, 46 respectively. The inner slide 72 has a 5.5 inch stroke and weighs 4,250 pounds with its respective die and is driven two 18 inch long connections, comprising inner slide connections 60, 62 and inner pistons 64, 66 respectively. Referring to FIG. 6, the displacement of outer slide 52 with respect to its crank angle and the displacement of inner slide 72 with respect to its crank angle is plotted to yield outer slide displacement curve 94 and inner slide displacement curve 96. The upper apex of both curves correspond to the top of the stroke for that respective slide. The crank angle degrees coordinates are chosen so that the top of the stroke for the outer slide 52 occurs at 0°, thus the top of the stroke for the inner slide 72 occurs at an easily discernable angle, here being at 80°. Both the outer slide displacement curve 94 and the inner slide displacement curve 96 are substantially periodic sine waves.

As shown in FIG. 1, the inertia forces of both the inner slide 72 and the outer slide 52 are plotted against their respective crank angle with the upper apex of the curves (denoted as negative values) corresponding to the top of the stroke for that respective slide.

Since the crank angle degrees coordinate system was chosen so that the top of the stroke of the displacement of outer slide 52 was at 0°, outer slide inertia force curve 84 begins at 0° which corresponds with the top of the stroke for the outer slide and has an inertia force of −52,000 pounds, where the negative sign denotes an upward force. Outer slide curve 84 is a substantially periodic sine wave that goes from an upward inertia force (−) of approximately 52,000 pounds to a downward inertia force (+) of approximately 62,000 pounds. Inner slide inertia force curve 86 lags outer slide curve 84 by approximately 80° as its top of the stroke occurs at approximately 80° as seen in FIG. 1. Since inner slide 72 has less weight, its inertia force will also be less. Inner slide curve 86 is also a substantially periodic sine wave that goes from an upward inertia force (−) of approximately 35,000 pounds to a downward inertia force (+) of approximately 47,000 pounds.

Figure 2:
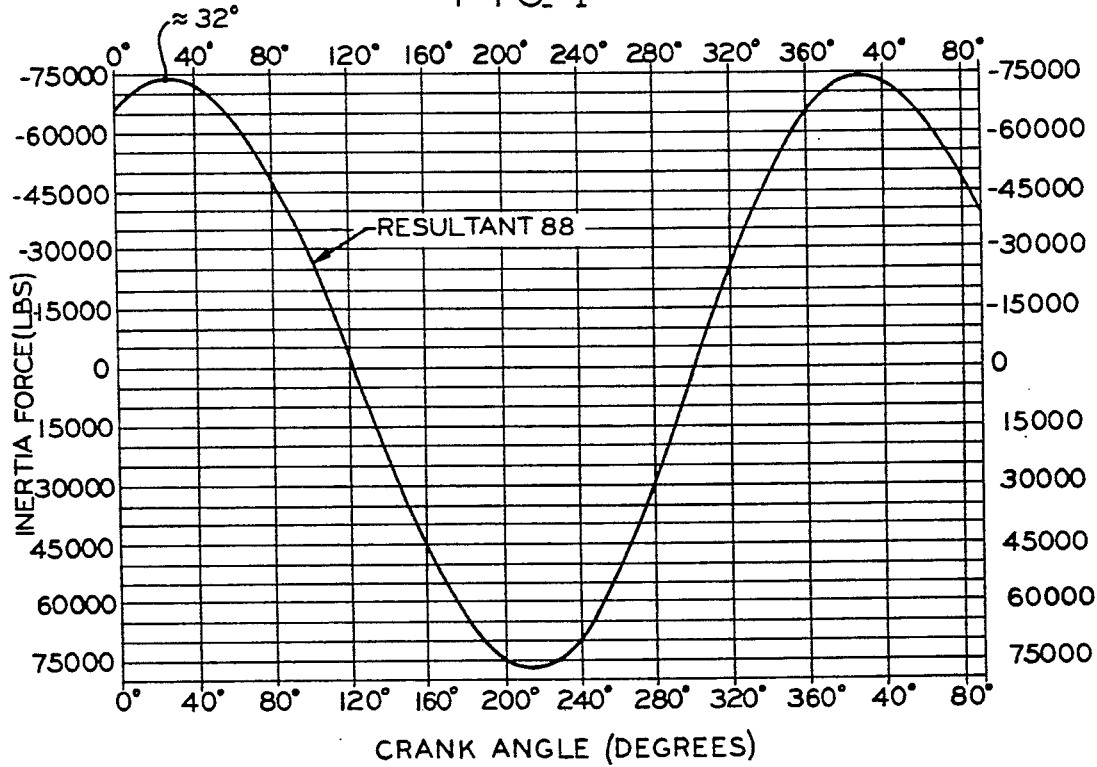
FIG. 2 is a graph of the resultant inertia force of the inner and outer slide versus the resultant crank angle.

In accordance with the present invention, as shown in FIG. 2, outer slide curve 84 and inner slide curve 86 are then resolved into a single inertia force resultant slide curve 88 by standard wave superposition. Resultant curve 88 is also a substantially periodic sine wave which goes from an upward inertia force (−) of approximately 74,000 pounds to a downward inertia force (+) of approximately 77,000 pounds.

Thus, resultant curve 88 represents the total inertia force exerted on the press by outer slide 52 and inner slide 72. Now, according to the present inventive method, resultant curve 88 representing the total inertia force can then be opposed by a 180° phase shifted substantially periodic sine wave of the same magnitude. This 180° phase shifted curve is the balancer curve 90 as shown plotted against the resultant curve 88 in FIG. 4. Since the top of the stroke of resultant curve 88 lags outer slide curve 84 (and thus the outer slide 52) by 32°, the top of the stroke of the balancer curve 90 must lag the outer slide curve 84 by 180°+32°, or 212°, diagrammatically shown in FIG. 3. The vertical inertia forces creating the vibration are reduced by the opposing vertical inertia force of the balancer.

Next, a physical balancer mechanism having a single mass, shown as balancer throw 76, balancer connection 78, balancer 80, and balancer wrist pin 82 in FIG. 1, must be chosen which substantially approximates the generated balancer curve 90 should its inertia force be plotted against its crank angle. For purposes of this application, the term "single mass" is defined as a mass or plurality of masses which contemporaneously reciprocate in unison. Thus as shown in FIG. 5, the single mass can consist of a single weight 80 centrally mounted on crankshaft 28 or the single mass may constitute several weights (not shown), in summation equal to the single mass, mounted along crankshaft 28 and reciprocating in unison. A single balancer of 13,345 pounds with a 3.25 inch stroke length driven with a 28 inch long connection and phased 212° behind outer slide 52 approximates balancer curve 90.

When the resultant curve 88 and balancer curve 90 are resolved into a single inertia force curve by standard wave superposition, a net out of balance inertia force curve 92 results as shown in FIG. 4. The out of balance curve 92 shows that the 74,000 pounds of total out of balance is reduced to approximately 3,500 pounds of out of balance.

By utilizing this method and apparatus, the total vertical inertia forces of a double action press generated by the inner and outer slides are balanced by a single balancer mass according to the inventive method within 4–10% of complete balance.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the claims.

What is claimed is:

1. In a double action press having a first reciprocating slide exhibiting a first characteristic inertia force curve, a second reciprocating slide exhibiting a second characteristic inertia force curve, a single reciprocating balancer means consisting essentially of a single mass reciprocating for substantially counterbalancing the inertia force defined by the superposition of said first characteristic inertia force curve and said second characteristic inertia force curve, wherein said first reciprocating slide, said second reciprocating slide, and said single reciprocating balancer means are connected to a single crankshaft.

2. The double action press as in claim 1, wherein said single reciprocating balancer means comprises:
   a weight;
   an eccentric throw on said crankshaft; and
   connection means for reciprocatingly connecting said weight to said eccentric throw.

3. The double action press as in claim 1, wherein said single reciprocating balancer means exhibits a characteristic balancer inertia force curve that is approximately 180° phase-shifted from the inertia force curve defined by the superposition of said first characteristic inertia force curve and said second characteristic inertia force curve.

4. The double action press as in claim 3, wherein said single reciprocating balancer means counterbalances 90 to 96% of the inertia force defined by the superposition of said first characteristic inertia force curve and said second characteristic inertia force curve.

5. The double action press as in claim 4, wherein said single reciprocating balancer means lags said first reciprocating slide by approximately 212°.

6. A double action press comprising:
   a housing;
   a crankshaft rotatably supported in said housing;
   at least one first throw located on said crankshaft;
   at least one first connection connected to said first throw;
   a first reciprocating slide connected to said first connection, having an inertia force exhibited by a first characteristic inertia force curve;
   at least one second throw located on said crankshaft;
   at least one second connection connected to said second throw;
   a second reciprocating slide connected to said second connection, having an inertia force exhibited by a second characteristic inertia force curve;
   a reciprocating balancer comprising a reciprocating single mass having an inertia force exhibited by a balancer force curve, wherein said balancer force curve is substantially equal to an 180° phase-shifted from the superposition of said first characteristic inertia force curve and said second characteristic force curve.

7. The apparatus of claim 6, wherein said reciprocating balancer counterbalances at least 90% of the inertia forces of said first reciprocating slide and said second reciprocating slide.

8. The apparatus of claim 6, wherein said reciprocating balancer counterbalances at least 96% of the inertia forces of said first reciprocating slide and said second reciprocating slide.

* * * * *